(12) United States Patent
Zhuang et al.

(10) Patent No.: US 11,799,688 B2
(45) Date of Patent: Oct. 24, 2023

(54) METHOD FOR MANAGING VIRTUAL PRIVATE NETWORK, AND DEVICE

(71) Applicant: Huawei Technologies Co., Ltd., Shenzhen (CN)

(72) Inventors: Shunwan Zhuang, Beijing (CN); Haibo Wang, Beijing (CN); Penghui Mi, Dongguan (CN); Yunan Gu, Beijing (CN); Gang Yan, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 17/106,931

(22) Filed: Nov. 30, 2020

(65) Prior Publication Data
US 2021/0083902 A1   Mar. 18, 2021

Related U.S. Application Data

(63) Continuation of application No. PCT/CN2019/088912, filed on May 29, 2019.

(30) Foreign Application Priority Data

Jun. 1, 2018 (CN) .......................... 201810555302.3

(51) Int. Cl.
*H04L 12/46* (2006.01)
*H04L 45/02* (2022.01)
(Continued)

(52) U.S. Cl.
CPC .......... *H04L 12/4675* (2013.01); *H04L 45/02* (2013.01); *H04L 45/04* (2013.01); *H04L 45/34* (2013.01); *H04L 45/507* (2013.01)

(58) Field of Classification Search
CPC ......... H04L 45/02; H04L 45/04; H04L 45/34; H04L 45/507
See application file for complete search history.

(56) References Cited

U.S. PATENT DOCUMENTS

| | | | |
|---|---|---|---|
| 8,151,000 B1 * | 4/2012 | Kodeboyina | ........... H04L 45/50 370/254 |
| 8,170,033 B1 * | 5/2012 | Kothari | ................... H04L 45/66 370/395.53 |

(Continued)

FOREIGN PATENT DOCUMENTS

| CN | 1708031 A | 12/2005 |
|---|---|---|
| CN | 101237409 A | 8/2008 |

(Continued)

OTHER PUBLICATIONS

Scudder, J., Ed., et al, "BGP Monitoring Protocol (BMP)," Request for Comments: 7854, Jun. 2016, 27 pages.

*Primary Examiner* — Melanie Jagannathan
(74) *Attorney, Agent, or Firm* — Conley Rose, P.C.

(57) ABSTRACT

In a method for managing a VPN, a routing device establishes a BMP session with a BMP server. The routing device allocates a VPN label associated with a VPN instance, wherein the VPN instance is used for communication between the routing device and another routing device. Then, the routing device sends, to the BMP server, a BMP message that carries the VPN label. Because the routing device sends the VPN label through the BMP message, the routing device does not need to establish a BGP peer relationship with the BMP server to send the VPN label.

20 Claims, 4 Drawing Sheets

(51) Int. Cl.
*H04L 45/00* (2022.01)
*H04L 45/50* (2022.01)

(56) References Cited

U.S. PATENT DOCUMENTS

| | | | | |
|---|---|---|---|---|
| 8,570,871 | B2* | 10/2013 | Yong | H04L 45/245 |
| | | | | 370/235 |
| 9,019,973 | B1* | 4/2015 | Shukla | H04L 45/66 |
| | | | | 370/395.31 |
| 9,071,514 | B1* | 6/2015 | Hegde | H04L 45/28 |
| 9,178,801 | B1* | 11/2015 | Guichard | H04L 45/22 |
| 9,450,829 | B2* | 9/2016 | Filsfils | H04L 47/724 |
| 9,660,897 | B1* | 5/2017 | Gredler | H04L 45/50 |
| 9,871,726 | B2* | 1/2018 | Vairavakkalai | H04L 45/04 |
| 10,200,274 | B1* | 2/2019 | Suryanarayana | H04L 45/02 |
| 10,243,840 | B2* | 3/2019 | Babu | G06F 13/128 |
| 2003/0012189 | A1* | 1/2003 | Nomura | H04L 47/16 |
| | | | | 370/389 |
| 2005/0047353 | A1* | 3/2005 | Hares | H04L 45/02 |
| | | | | 370/255 |
| 2005/0094566 | A1* | 5/2005 | Hares | H04L 45/02 |
| | | | | 370/255 |
| 2005/0097203 | A1* | 5/2005 | Unbehagen | H04L 12/2854 |
| | | | | 709/223 |
| 2006/0227723 | A1* | 10/2006 | Vasseur | H04L 45/033 |
| | | | | 370/254 |
| 2007/0140251 | A1 | 6/2007 | Dong | |
| 2010/0177674 | A1* | 7/2010 | Aggarwal | H04L 45/02 |
| | | | | 370/401 |
| 2010/0260041 | A1 | 10/2010 | Yan et al. | |
| 2011/0013637 | A1* | 1/2011 | Xue | G06Q 20/027 |
| | | | | 370/395.5 |
| 2012/0057599 | A1* | 3/2012 | Yong | H04L 47/2483 |
| | | | | 370/395.53 |
| 2012/0224506 | A1* | 9/2012 | Gredler | H04L 45/124 |
| | | | | 370/254 |
| 2012/0281539 | A1* | 11/2012 | Patel | H04L 45/04 |
| | | | | 370/241 |
| 2013/0059527 | A1 | 3/2013 | Hasesaka et al. | |
| 2013/0117449 | A1* | 5/2013 | Hares | H04L 9/40 |
| | | | | 709/225 |
| 2013/0266013 | A1* | 10/2013 | Dutta | H04L 47/12 |
| | | | | 370/392 |
| 2014/0086253 | A1* | 3/2014 | Yong | H04L 49/70 |
| | | | | 370/395.53 |
| 2015/0003458 | A1* | 1/2015 | Li | H04L 45/507 |
| | | | | 370/392 |
| 2015/0092780 | A1 | 4/2015 | Li et al. | |
| 2015/0109904 | A1* | 4/2015 | Filsfils | H04L 45/50 |
| | | | | 370/221 |
| 2015/0263867 | A1 | 9/2015 | Chen et al. | |
| 2015/0381493 | A1* | 12/2015 | Bansal | H04L 45/741 |
| | | | | 370/392 |
| 2016/0014021 | A1* | 1/2016 | Li | H04L 45/50 |
| | | | | 370/389 |
| 2016/0248657 | A1* | 8/2016 | Kasiviswanathan | H04L 45/02 |
| 2017/0134308 | A1* | 5/2017 | Zhuang | H04L 49/25 |
| 2017/0230198 | A1* | 8/2017 | Xu | H04L 45/04 |
| 2018/0062984 | A1* | 3/2018 | Hill | H04L 47/825 |
| 2018/0102919 | A1* | 4/2018 | Hao | H04L 41/50 |
| 2018/0375763 | A1* | 12/2018 | Brissette | H04L 45/507 |
| 2019/0013966 | A1* | 1/2019 | Nagarajan | H04L 45/28 |
| 2019/0132280 | A1* | 5/2019 | Meuninck | H04L 69/321 |
| 2019/0372858 | A1* | 12/2019 | Krishnamurthy | H04L 41/145 |
| 2021/0083901 | A1* | 3/2021 | He | H04L 45/507 |

FOREIGN PATENT DOCUMENTS

| | | |
|---|---|---|
| CN | 101459549 A | 6/2009 |
| CN | 106464587 A | 2/2017 |
| CN | 106487696 A | 3/2017 |
| CN | 106789638 A | 5/2017 |
| CN | 106850380 A | 6/2017 |
| EP | 3108625 A1 | 12/2016 |
| JP | 2017147499 A | 8/2017 |
| WO | 2015135444 A1 | 9/2015 |

* cited by examiner

METHOD FOR MANAGING VIRTUAL PRIVATE NETWORK, AND DEVICE

CROSS-REFERENCE TO RELATED APPLICATIONS

This is a continuation of Int'l Patent App. No. PCT/CN2019/088912, filed on May 29, 2019, which claims priority to Chinese Patent App. No. 201810555302.3, filed on Jun. 1, 2018, which are incorporated by reference.

FIELD

This disclosure relates to the communications field, and in particular, to a method for managing a virtual private network, and a device.

BACKGROUND

A virtual private network (VPN), widely applied on enterprise networks, refers to a private network established on a public network. A VPN gateway enables remote access by encrypting a data packet and translating a destination address of the data packet. There are a plurality of manners for classifying VPNs, and the VPNs are mainly classified according to protocols. The VPNs may be implemented in a plurality of manners such as servers, hardware, and software. Information of the VPN is used to transfer network information of an intranet through a public network architecture, for example, the internet. The VPN uses an encrypted tunneling protocol to implement private message security such as confidentiality, sender certification, and message accuracy. This technology may use an insecure network, such as the internet, to send a reliable and secure message.

SUMMARY

An objective of embodiments of this disclosure is to provide VPN management.

According to a first aspect, an embodiment provides a method for managing a VPN. According to the method, a first routing device establishes a BGP Monitoring Protocol (BMP) session with a BMP server. The first routing device allocates a VPN label associated with a VPN instance, where the VPN instance is used for communication between the first routing device and a second routing device. The first routing device sends, to the BMP server, a BMP message that carries the VPN label.

In a possible design, the BMP message that carries the VPN label is an extended peer up notification message, and the VPN label is carried in a type-length-value (TLV) in the extended Peer Up Notification message.

In a possible design, the BMP message that carries the VPN label is a newly-defined BMP message, and the VPN label is carried in a protocol data unit (PDU) in the newly-defined BMP message.

In a possible design, the PDU includes an identifier of the VPN instance, and a corresponding relationship between the VPN label and an Internet Protocol (IP) address segment that includes an IP address of user equipment.

In a possible design, the VPN label is a multi-protocol label switching (MPLS) label or a Segment Routing over IPv6 (SRv6) segment identifier (SID).

In a possible design, the method further includes: The first routing device receives, from the second routing device, a data packet whose destination is the user equipment, where the received data packet carries the VPN label. The first routing device deletes the VPN label in the data packet to obtain a processed data packet. The first routing device sends the processed data packet to the user equipment based on the VPN label.

According to a second aspect, an embodiment provides a method for managing a VPN. According to the method, a BMP server establishes a BMP session with a first routing device. The BMP server receives, from the first routing device, a BMP message that carries a VPN label. The BMP server obtains routing information based on the VPN label, where the routing information includes the VPN label, a destination address segment, a VPN instance identifier, and a next hop. The BMP server sends the routing information to a second routing device.

In a possible design, the BMP message that carries the VPN label is an extended peer up notification message, and the VPN label is carried in a TLV in the extended peer up notification message.

In a possible design, the BMP message that carries the VPN label is a newly-defined BMP message, and the VPN label is carried in a PDU in the newly-defined BMP message.

In a possible design, the PDU includes the routing information.

In a possible design, the destination address segment is an address segment that includes an IP address of user equipment, the VPN instance identifier is an identifier of a VPN instance that is on the first routing device and that is used to communicate with the second routing device, and the next hop is an IP address of the first routing device.

According to a third aspect, an embodiment provides a routing device. The routing device includes a memory and a processor connected to the memory. The processor is configured to execute a computer-readable instruction in the memory to establish a BMP session with a BMP server and allocate a VPN label associated with a VPN instance to the routing device, where the VPN instance is used for communication between the routing device and a different routing device. The first routing device sends, to the BMP server, a BMP message that carries the VPN label.

In a possible design, the BMP message that carries the VPN label is an extended peer up notification message, and the VPN label is carried in a TLV in the extended peer up notification message.

In a possible design, the BMP message that carries the VPN label is a newly-defined BMP message, and the VPN label is carried in a PDU in the newly-defined BMP message.

In a possible design, the PDU includes an identifier of the VPN instance, and a corresponding relationship between the VPN label and an IP address segment that includes an IP address of user equipment.

In a possible design, the VPN label is an MPLS label or an SRv6 SID.

In a possible design, the processor is further configured to: receive, from the different routing device, a data packet whose destination is the user equipment, where the received data packet carries the VPN label, delete the VPN label in the data packet to obtain a processed data packet, and send the processed data packet to the user equipment based on the VPN label.

According to a fourth aspect, an embodiment provides a BMP server. The BMP server includes a memory and a processor connected to the memory. The processor is configured to execute a computer-readable instruction in the memory to establish a BMP session with a first routing device, receive, from the first routing device, a BMP message that carries a VPN label, and obtain routing information based on the VPN label, where the routing information includes the VPN label, a destination address segment, a VPN instance identifier, and a next hop. The BMP server sends the routing information to a second routing device.

In a possible design, the BMP message that carries the VPN label is an extended peer up notification (message, and the VPN label is carried in a TLV in the extended peer up notification message.

In a possible design, the BMP message that carries the VPN label is a newly-defined BMP message, and the VPN label is carried in a PDU in the newly-defined BMP message.

In a possible design, the PDU includes the routing information.

In a possible design, the destination address segment is an address segment that includes an IP address of user equipment, the VPN instance identifier is an identifier of a VPN instance that is on the first routing device and that is used to communicate with the second routing device, and the next hop is an IP address of the first routing device.

In the VPN network management in, the routing device can efficiently send the VPN label to the BMP server by sending, to the BMP server, a BMP packet that carries the VPN label. Therefore, the routing device does not need to establish a border gateway protocol (BGP) relationship with the BMP server to send the VPN label or send, to the BMP server, information that is not required by the BMP server. This greatly saves network resources and improves network efficiency.

DETAILED DESCRIPTION

The following describes the present disclosure in detail with reference to the accompanying drawings and specific embodiments. However, it should be noted that, the following embodiments are only examples for ease of understanding the technical solutions, but are not intended to limit the present disclosure.

Figure 1:
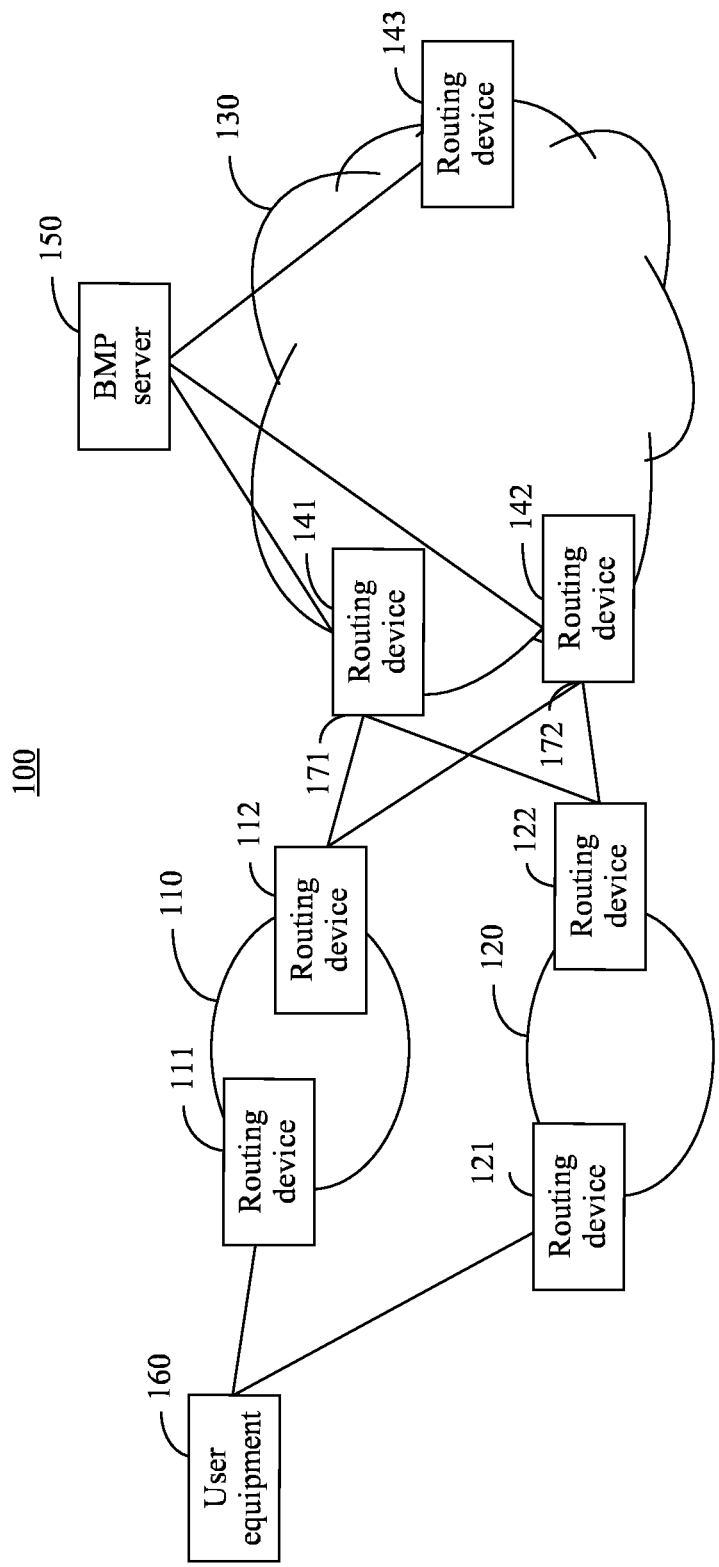
FIG. 1 is a schematic diagram of a network 100 according to an embodiment.

FIG. 1 is a schematic diagram of a network 100. A network system 100 includes a network 110, a network 120, and a network 130. The network 130 includes a plurality of routing devices, such as routing devices 141 to 143. The routing devices 141 to 143 are all connected to a BGP server 150, and the routing devices 141 to 143 each include a BMP client module that is configured to communicate with the BMP server 150. The BMP server 150 refers to a hardware device that supports a function of the BMP server, for example, a controller, a gateway server, a router, or a switch that supports the function of the BMP server. The function of the BMP server includes a function capable of sending, receiving, and identifying a packet that is based on a BMP protocol. The network 100 further includes user equipment 160. The user equipment 160 is communicatively connected to the network 130 through the network 110 and the network 120. The network 110 is communicatively connected to the user equipment 160 through a routing device 111, and is communicatively connected to the routing devices 141 and 142 in the network 130 through a routing device 112. The network 120 is communicatively connected to the user equipment 160 through a routing device 121, and is communicatively connected to the routing devices 141 and 142 in the network 130 through a routing device 122. The routing devices 111, 112, 121 and 122, and the routing devices 141 to 143 may be routers or other network devices having a routing or forwarding function. The routing devices 111 and 112 are located at a border of the network 110, and may be referred to as border routing devices of the network 110. The routing devices 121 and 122 are located at a border of the network 120, and may be referred to as border routing devices of the network 120. The routing devices 141 to 143 are located at a border of the network 130 and may be referred to as border routing devices of the network 130. The networks 110 to 130 each may include other border routing devices and may further include some internal routing devices.

In a data packet transmission process, both the routing device 141 and the routing device 142 may forward a data packet whose destination is the user equipment 160 to the user equipment 160. For example, the routing device 141 may send the data packet to the user equipment 160 through the network 110, and the routing device 142 may send the data packet to the user equipment 160 through the network 120. In some cases, due to a performance limitation of a device in the network or another reason, the BMP server 150 needs to control the network, so that the routing device 142 sends the data packet whose destination is the user equipment 160 to the routing device 141, and then, the routing device 141 sends the packet to the user equipment 160 through an interface 171. In this way, the packet is no longer sent to the user equipment 160 through a port 172 on the routing device 142. To implement such control, the BMP server needs to obtain a VPN label used by the routing device 142 to send the data packet to the routing device 141 through a VPN. The VPN label is used to indicate that the data packet belongs to the VPN. In some scenarios, the VPN label may be an MPLS label or an SRv6 SID, where the SRv6 SID is defined by draft-dawra-idr-srv6-vpn-03.txt of the IETF. After obtaining the VPN label, the BMP server 150 may send an entry that includes a destination IP address segment, a next hop, a VPN label, and a VPN instance identifier to the routing device 142. The entry actually includes a corresponding relationship among the destination IP address segment, the next hop, the VPN label, and the VPN instance identifier. The destination IP address segment is obtained based on an IP address of the user equipment 160 and includes the IP address of the user equipment 160. The next hop is an IP address of the routing device 141. The VPN label is a VPN label associated with a VPN instance, and the VPN instance is used for communication between the routing device 141 and the routing device 142. The VPN instance identifier is used to identify the VPN instance. The VPN instance identifier is carried in a protocol packet, for example, an interior gateway protocol (IGP) packet or a BGP packet, and is used to indicate that the protocol packet corresponds to the VPN instance or belongs to a VPN that is based on the VPN instance. In some special cases, the destination IP address segment may include only the IP address of the user equipment 160. After receiving the entry, the routing device 142 adds the VPN label to the data packet whose destination is the user equipment 160, and sends, to the routing device 141 based on the next hop in the entry, the data packet that carries the VPN label. The routing device 141 processes the packet, for example, deletes the VPN label to obtain a processed data packet, and sends the processed data packet to the user equipment 160 based on the VPN label.

To enable the BMP server 150 to obtain the VPN label, the BMP server 150 may establish a BGP peer relationship with the routing device 141, and when the routing device 141 sends a VPN route to the BMP server 150 based on the BGP peer relationship, the VPN label is carried. However, in this case, the routing device 141 needs to establish the BGP peer relationship with the BMP server 150, and further needs to send some information that is not required by the BMP server to the BMP server 150. This occupies network resources and reduces network efficiency.

In this embodiment, the routing device 141 may send the VPN label to the BMP server 150 by sending, to the BMP server 150, a BMP packet that carries the VPN label. Therefore, the routing device 141 does not need to establish the BGP peer relationship with the BMP server to send the VPN label, and does not need to send information that is not required by the BMP server to the BMP server. This greatly saves network resources and improves network efficiency.

Figure 2:
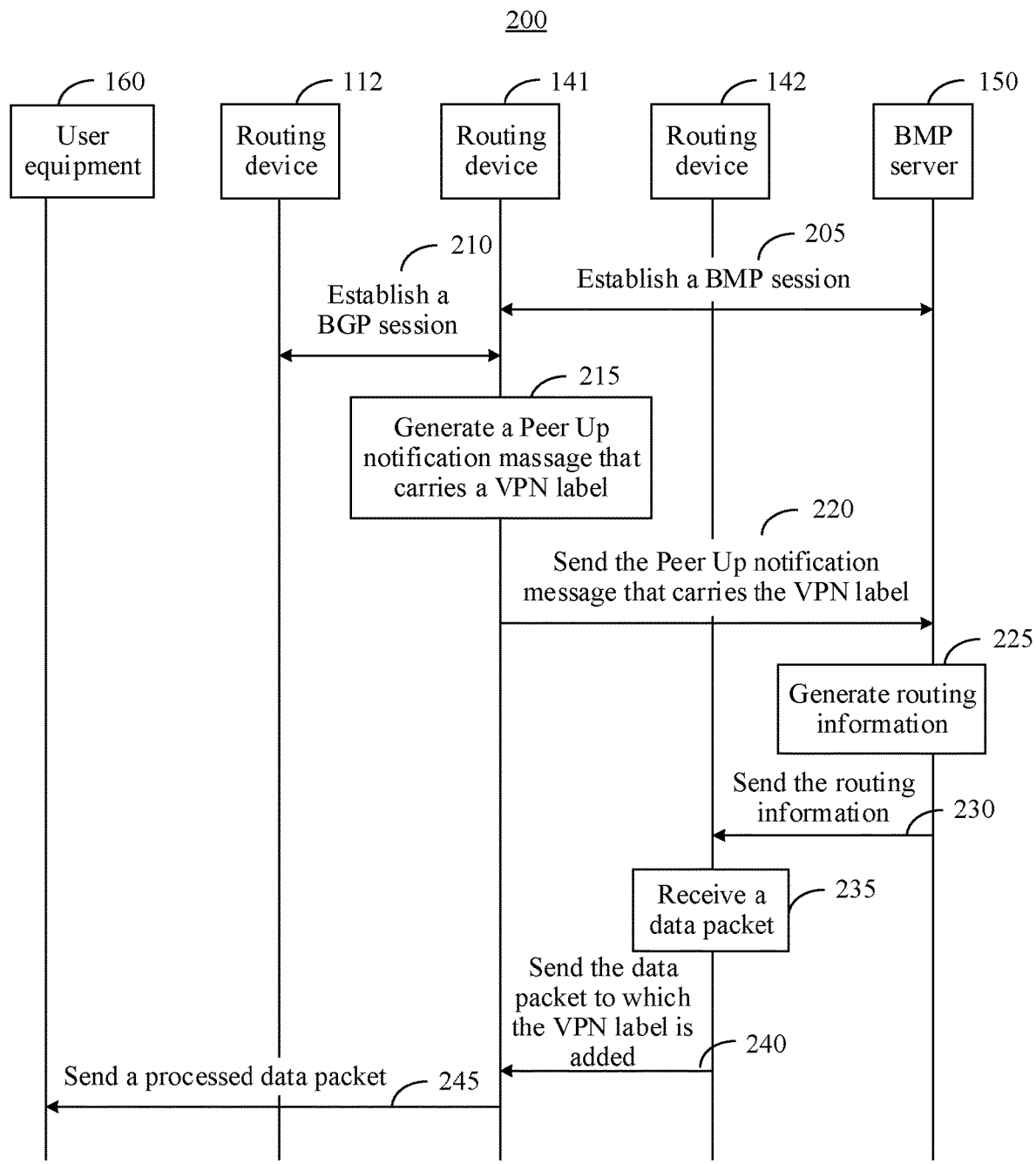
FIG. 2 is a flowchart of a network management method 200 according to an embodiment.

FIG. 2 shows a network management method 200 according to an embodiment. The network management method 200 includes the following content.

205. A BMP server 150 establishes a BMP session with a routing device 141.

210. The routing device 141 establishes a BGP session with a routing device 112. The routing device 141 and the routing device 112 send BGP routing information to each other after establishing the BGP session. BGP routing information received by the routing device 141 from the routing device 112 includes a network segment route in which an IP address of user equipment 160 is located. A VPN instance is configured on the routing device 141 to manage an interface on the routing device 141, where the routing device 141 is coupled to the routing device 112 through the interface. From a perspective of the routing device 141, all routes sent from the routing device 112 are routes of the VPN instance.

215. After the BGP session is established, the routing device 141 generates a Peer Up Notification message that carries a VPN label. The VPN label is associated with a VPN instance. The VPN instance is used for communication between the routing device 141 and a routing device 142. The VPN instance is configured on the routing device 141, and a VPN instance is also configured on the routing device 142. Based on the two VPN instances, the routing devices 141 and 142 may implement communication based on a VPN. Content of the two VPN instances is different, and the two VPN instances are used to obtain a VPN that includes the routing devices 141 and 142. Instance identifiers of the two VPN instances may be the same or different.

The Peer Up Notification message that carries the VPN label may be obtained by extending a Peer Up Notification in RFC7854. Extending the Peer Up Notification in RFC7854 includes adding a TLV that includes the VPN label to the Peer Up Notification message in RFC7854. The TLV may be a BMP Information TLV defined in the BMP, or may be a sub-TLV defined in the BMP Information TLV.

In addition, the Peer Up Notification message that carries the VPN label further carries a VPN instance identifier of the VPN instance. The VPN instance identifier may be a route distinguisher (RD), and may be carried in a Per-peer Header of the Peer Up Notification message. An operation of carrying an RD is required by RFC7854 for a Peer Up Notification message. When RFC7854 is applied to monitoring a BGP session in a VPN instance, a Per-peer Header carries an RD. A message that carries the Per-peer Header, for example, a Peer Up Notification message, may carry the RD. In addition, because a Route Monitoring message may also carry the Per-peer Header, the Route Monitoring message may also carry the RD.

A structure of an extended Peer Up Notification message may be as follows:

Common Header+Per-Peer Header+Peer Up Notification PDU+Information TLVs

RFC7854 describes specific structures of the Common Header, the Per-Peer Header, the Peer Up Notification PDU, and the Information TLV.

The generated Peer Up Notification message may carry different types of VPN labels. For example, the VPN label carried in the message may be a VPN label allocated based on each VPN instance, a VPN label allocated based on each customer edge (CE) device, a VPN label allocated based on each interface, or a VPN label allocated based on each Ethernet segment. When the VPN label is a VPN label allocated based on each VPN instance, the Peer Up Notification message may further carry an IP address of a CE device (for example, the routing device 112). When the VPN label is a VPN label allocated based on each interface, the Peer Up Notification message may further carry outbound interface information. When the VPN label is a VPN label allocated based on each Ethernet segment, the Peer Up Notification message may further carry an identifier of the Ethernet segment. The generated Peer Up Notification message may carry one of the foregoing plurality of labels, or carry a plurality or all of the foregoing plurality of labels. In other words, in addition to the VPN label, the Peer Up Notification message may further carry another VPN label.

Allocating a VPN label based on each VPN instance refers to allocating different VPN labels to different VPN instances. For example, a VPN label 1 is allocated to a VPN instance 1 and a VPN label 2 is allocated to a VPN instance 2. The VPN label 1 is added to a data packet to be sent through the VPN instance 1. The VPN label 2 is added to a data packet to be sent through the VPN instance 2. A VPN label based on each VPN instance may be allocated by the routing device 141 before 210 is performed.

Allocating a VPN label based on each CE device refers to allocating different VPN labels to different CE devices that are coupled to same user equipment. In the network shown in FIG. 1, because the routing devices 112 and 122 finally connect the user equipment 160 to the network 130, from a perspective of the network 130, the routing devices 112 and 122 may be considered as CE devices. In this case, the allocating a VPN label based on each CE device may refer to allocating a VPN label 3 to the routing device 112 and allocating a VPN label 4 to the routing device 122. The label 3 is added to a data packet to be sent through the routing device 112 to the user equipment 160, and the label 4 is added to a data packet to be sent through the routing device 122 to the user equipment 160.

Allocating a VPN label based on each interface refers to allocating different VPN labels to different interfaces that are on one routing device and that are coupled to same user equipment. In the network shown in FIG. 1, the routing device 141 may send a data packet to the user equipment 160 through the interface 171. There is another interface, through which the routing device 141 may send a data packet to the user equipment 160, on the routing device 141. In this case, different VPN labels may be respectively allocated to the interface 171 and the another interface. For example, a VPN label 5 is allocated to the interface 171, and a VPN label 6 is allocated to the another interface. The label 5 is added to the data packet to be sent through the interface 171 to the user equipment 160, and the label 6 is added to the data packet to be sent through the another interface to the user equipment 160.

The Ethernet segment refers to Ethernet interface groups that are distributed on a plurality of access devices and that are coupled to a same CE device. Allocating a VPN label based on each Ethernet segment refers to allocating a VPN label to each Ethernet segment. In the network 100 shown in FIG. 1, the routing devices 112 and 122 in the networks 110 and 120 may be CE devices of the user equipment 160, and the routing devices 141 and 142 each are coupled to the routing device 112 as provider edge (PE) devices. In addition, the routing devices 141 and 142 each are further coupled to the routing device 122. Ports that are on the routing devices 141 and 142 and that are configured to be coupled to the routing device 112 belong to one Ethernet interface group, and ports that are on the routing devices 141 and 142 and that are configured to be coupled to the routing device 122 belong to another Ethernet interface group.

220. The routing device 141 sends, to the BMP server 150, the Peer Up Notification message that carries the VPN label. After receiving the VPN label, the BMP server 150 may manage a corresponding packet in the network based on the VPN label. Packet management may be performed in a plurality of manners. 225 and a subsequent operation in 225 relate to one of the management manners.

225. The BMP server 150 generates routing information based on the VPN label in the received Peer Up Notification message. The routing information may include a destination address segment, a next hop, the VPN label, and a VPN instance identifier. The destination address segment may be an IP address segment that includes the IP address of the user equipment 160. The next hop may be the IP address of the routing device 141. The VPN label may be the VPN label carried in the Peer Up Notification message. The VPN instance identifier may be a VPN instance identifier carried in the Per-Peer Header. Because the Peer Up Notification message received by the BMP server may carry one or more VPN labels, the VPN label in the routing information or the Peer Up Notification message may refer to one or more VPN labels. The destination address segment may be obtained by the BMP server 150 from a Route Monitoring message that is defined in RFC7854 and that is received from the routing device 141. The Route Monitoring message may be sent by the routing device 141 to the BMP server 150 after the routing device 141 sends the Peer Up Notification message. The Route Monitoring message carries a corresponding relationship between the VPN instance and the destination address segment. Because both the destination address segment and the VPN label correspond to the VPN instance identifier, the BMP server 150 may determine that the destination address segment and the VPN label correspond to each other.

230. The BMP server 150 sends the routing information to the routing device 142.

235. The routing device 142 receives a data packet to be sent to the user equipment 160. A destination IP address of the data packet is the IP address of the user equipment 160. The data packet may be received from an internal routing device in the network 130, or may be received from a border routing device in the network 130.

240. According to the destination IP address of the packet and the routing information that is received from the BMP server 150, the routing device 142 determines that the VPN label in the routing information needs to be added to the data packet, and sends, to the routing device 141, the data packet that carries the VPN label.

245. After receiving the data packet, the routing device 141 processes the data packet, for example, deletes the VPN label to obtain a processed data packet, and sends the processed data packet based on the VPN label.

Because the routing device 141 sends the VPN label to the BMP server 150 through the extended Peer Up Notification message, the routing device 141 does not need to establish a BGP peer relationship with the BMP server 150, and does not need to transfer, based on a requirement of the BGP peer relationship, some information that is not required by the BMP server to the BMP server. This improves network resource utilization.

In this embodiment, the routing device 141 may alternatively not send the VPN label to the BMP server 150 through the Peer Up Notification message, but carry the VPN label by extending the route monitoring message defined in RFC7854. To be specific, 205 to 210 may remain unchanged. When the operations in 215 to 220 are performed, the Peer Up Notification message defined in RFC7854 is generated and sent to the BMP server 150. After 220, the routing device 141 sends, to the BMP server 150, a Route Monitoring message that carries the VPN label. The BMP server 150 generates routing information based on the VPN label carried in the Route Monitoring message, where the routing information is the same as the routing information generated in the operation in 225. After the routing information is generated, 230 to 245 are performed in sequence in the method. Extension of the Route Monitoring message is similar to the extension of the Peer Up Notification message. A TLV that includes the VPN label needs to be added to the Route Monitoring message defined in RFC7854. The TLV may be a BMP Information TLV defined in the BMP, or may be a sub-TLV defined in the BMP Information TLV. Similar to the extended Peer Up Notification message, the extended Route Monitoring message may carry one or more VPN labels. For example, the extended Route Monitoring message may carry a VPN label allocated based on each VPN instance, a VPN label allocated based on each CE device and an IP address of the CE device, a VPN label allocated based on each interface and outbound interface information, or a VPN label allocated based on each Ethernet segment and an identifier of the Ethernet segment. The generated Route Monitoring message may carry one of the foregoing plurality of labels, or carry a plurality or all of the foregoing plurality of labels.

No matter the VPN label is sent to the BMP server 150 through the extended Peer Up Notification message or the extended Route Monitoring message, the routing information generated by the BMP server 150 may be the same as the routing information generated in content shown in FIG. 1. An operation performed by the routing device 142 after the routing information is received may also be the same as an operation performed by the routing device 142 after the routing information in the content shown in FIG. 1 is received.

Figure 3:
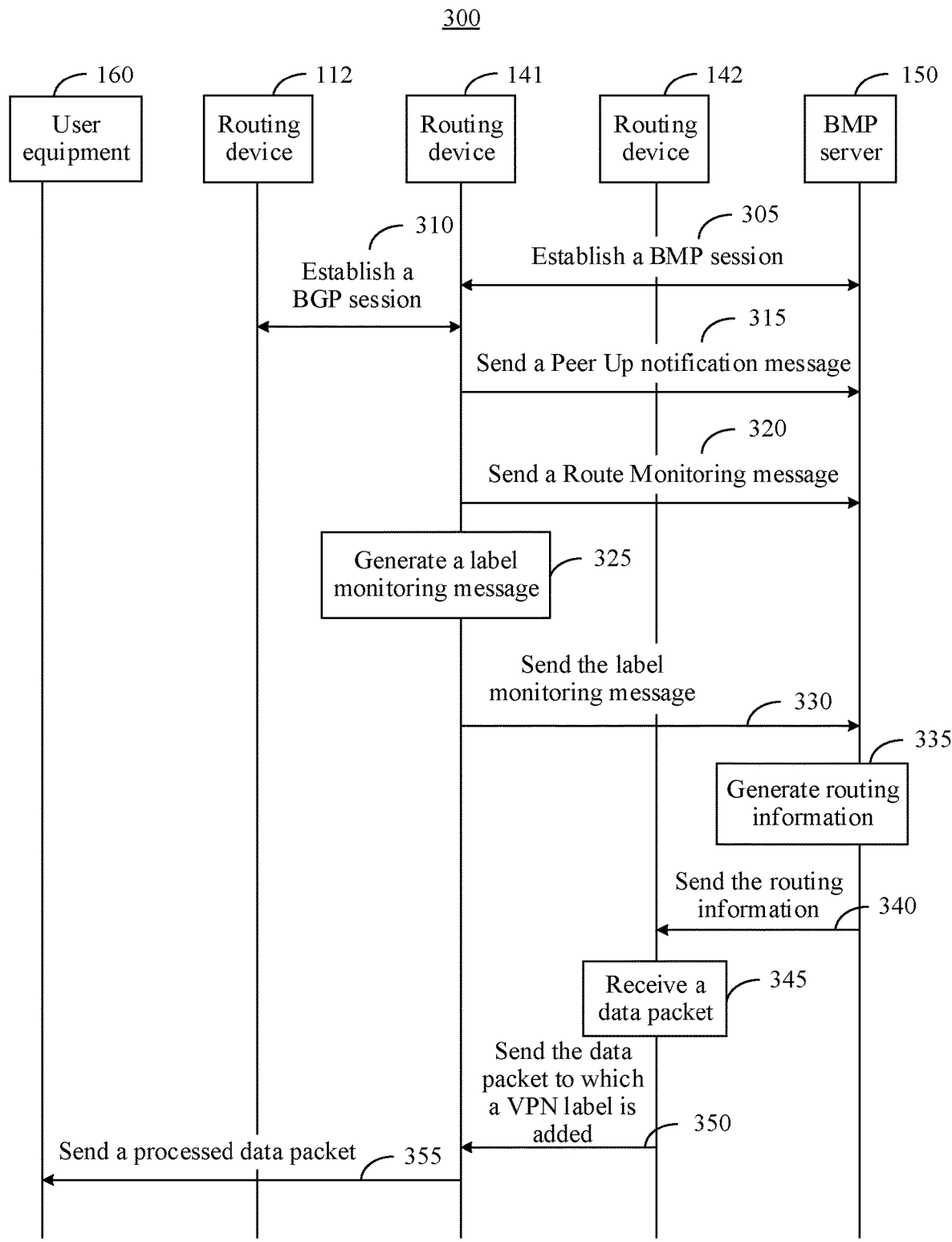
FIG. 3 is a flowchart of a network management method 300 according to an embodiment.

FIG. 3 shows a network management method 300 according to an embodiment. The network management method 300 includes the following content.

305. A BMP server 150 establishes a BMP session with a routing device 141.

310. The routing device 141 establishes a BGP session with a routing device 112. The routing device 141 and the routing device 112 send BGP routing information to each other after establishing the BGP session. BGP routing information received by the routing device 141 from the routing device 112 includes a network segment route in which an IP address of user equipment 160 is located. A VPN instance is configured on the routing device 141 to manage an interface on the routing device 141, where the routing device 141 is coupled to the routing device 112 through the interface. From a perspective of the routing device 141, all routes sent from the routing device 112 are routes of the VPN instance.

315. After the BGP session is established, the routing device 141 sends a Peer Up Notification message to the BMP server 150. The Peer Up Notification message is based on RFC7854.

320. The routing device 141 sends a Route Monitoring Notification message to the BMP server 150. The Route Monitoring Notification message is based on RFC7854.

325. The routing device 141 generates a label monitoring message, where the label monitoring message includes a destination IP address segment, a VPN label, and a VPN instance identifier. Actually, the label monitoring message carries a corresponding relationship among the destination IP address segment, a next hop, the VPN label, and the VPN instance identifier. The destination IP address segment is obtained by the routing device 141 based on the BGP session, the VPN label may be allocated by the routing device 141 to a VPN route in the VPN instance, and the VPN instance identifier is taken from the VPN instance. The routing device 141 learns a VRF route based on the BGP session, where the destination IP address segment may be a VRF routing prefix in the VRF route, and the VPN instance identifier may be a VRF RD of the VPN instance in which the VRF route is located. The label monitoring message may alternatively have another name, and a main function of the label monitoring message is to send, based on the BMP, a corresponding relationship between a VPN label and a VRF route, where the VRF route includes a destination IP address segment and a VPN instance identifier.

The label monitoring message is based on the BMP, and may also be referred to as a VPN label monitoring message. A structure of the label monitoring message may be as follows:

Common Header+Per-Peer Header+VPN Label Monitoring PDU+Information TLVs

RFC7854 describes specific structures of the Common Header, the Per-Peer Header, and the Information TLV.

The corresponding relationship between the VPN label and the VRF route may be carried in a VPN Label Monitoring PDU, and a format of the VPN Label Monitoring PDU is as follows:

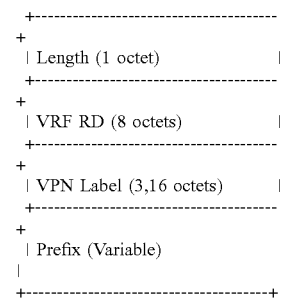

330. The routing device 141 sends the label monitoring message to the BMP server 150.

335. The BMP server 150 generates routing information based on the label monitoring message, where the routing information includes the destination IP address segment, the VPN label, the VPN instance identifier, and a next hop. The next hop includes an IP address of the routing device 141.

340. The BMP server 150 sends the routing information to a routing device 142.

345. The routing device 142 receives a data packet to be sent to the user equipment 160. A destination IP address of the data packet is the IP address of the user equipment 160. The data packet may be received from an internal routing device in a network 130, or may be received from a border routing device in a network 130.

350. According to the destination IP address of the data packet and the routing information that is received from the BMP server, the routing device 142 determines that the VPN label in the routing information needs to be added to the data packet, and sends, to the routing device 141, the data packet that carries the VPN label.

355. After receiving the data packet that carries the VPN label, the routing device 141 processes the data packet, for example, deletes the VPN label to obtain a processed data packet, and sends the processed data packet based on the VPN label.

In this embodiment, all the routing information generated by the BMP server 150 may be the same as the routing information generated in content shown in FIG. 1. An operation performed by the routing device 142 after the routing information is received may also be the same as an operation performed by the routing device 142 after the routing information in the content shown in FIG. 1 is received.

Figure 4:
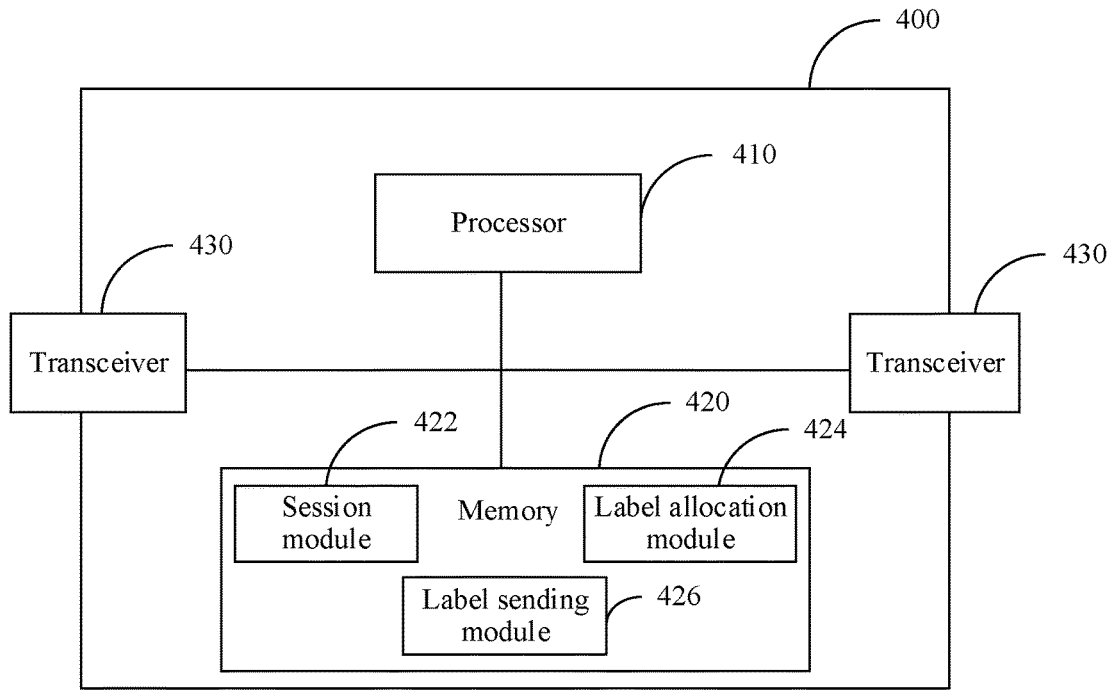
FIG. 4 is a schematic diagram of a routing device 400 according to an embodiment.

FIG. 4 is a schematic diagram of a routing device 400 according to an embodiment.

As shown in FIG. 4, the routing device 400 includes a processor 410, a memory 420 coupled to the processor 410, and a transceiver 430. The routing device 400 may be the routing device 141 in FIG. 1, FIG. 2, or FIG. 3. The processor 410 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor 410 may be one processor, or may include a plurality of processors. The memory 420 may include a volatile memory (such as a random-access memory (RAM), or the memory may include a non-volatile memory such as a read-only memory (ROM), a flash memory, a hard disk drive (HDD), or a solid-state drive (SSD). Alternatively, the memory may include a combination of the foregoing types of memories. The memory 420 stores a computer-readable instruction, where the computer-readable instruction includes a plurality of software modules, for example, a BMP session module 422, a label allocation module 424, and a label sending module 426. After executing each software module, the processor 410 may perform a corresponding operation according to an indication of each software module. In this embodiment, an operation performed by a software module is actually an operation performed by the processor 410 according to an indication of the software module. The BMP session module 422 may be configured to establish a BMP session with a BMP server. The label allocation module 424 is configured to allocate a VPN label associated with a VPN instance, where the VPN instance is used for communication between two routing devices. For example, when the routing device 400 is a routing device 141, the VPN instance is used to enable the routing device 141 and a routing device 142 to perform communication based on a VPN. The label sending module 426 sends, to the BMP server, a BMP message that carries the VPN label. In addition, after executing the computer-readable instruction in the memory 420, the processor 410 may perform, according to an indication of the computer-readable instruction, all operations that may be performed by the routing device 141, for example, operations performed by the routing device 141 in the embodiments corresponding to FIG. 1, FIG. 2, and FIG. 3.

Figure 5:
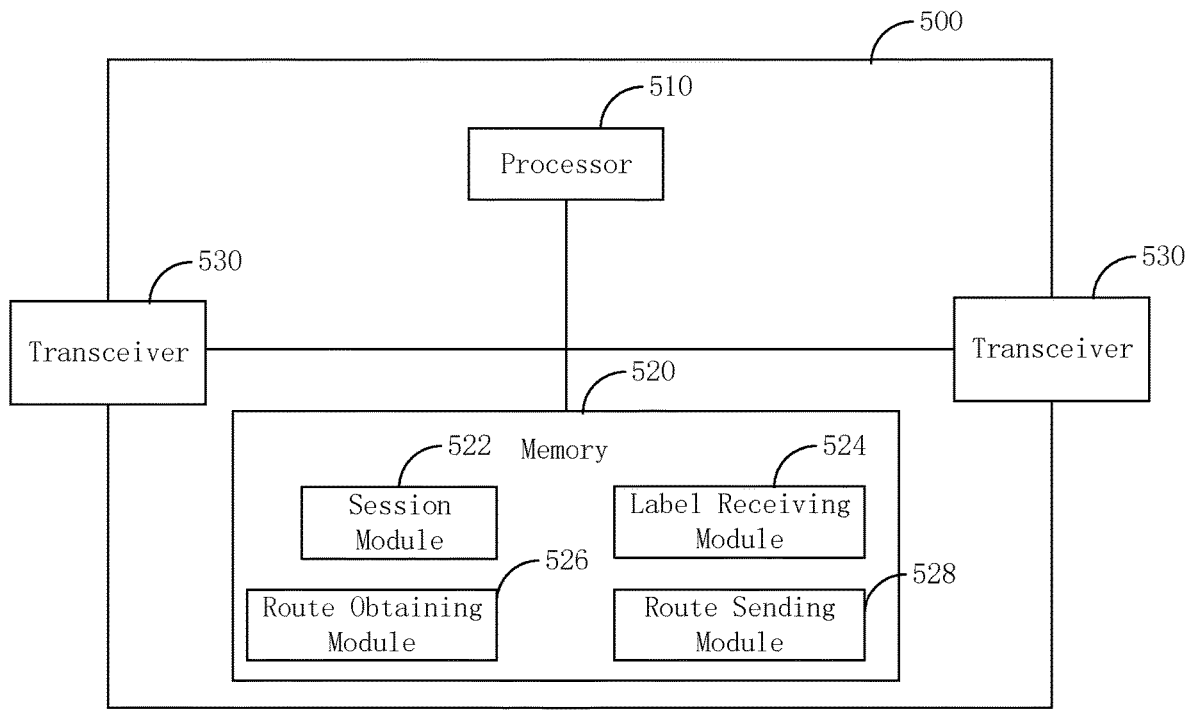
FIG. 5 is a schematic diagram of a BMP server 500 according to an embodiment.

FIG. 5 is a schematic diagram of a BMP server 500 according to an embodiment.

As shown in FIG. 5, the routing device 500 includes a processor 510, a memory 520 coupled to the processor 510, and a transceiver 530. The routing device 500 may be the BMP server 150 in FIG. 1, FIG. 2, or FIG. 3. The processor 510 may be a CPU, an NP, or a combination of a CPU and an NP. Alternatively, the processor may be an ASIC, a PLD, or a combination thereof. The PLD may be a CPLD, an FPGA, GAL, or any combination thereof. The processor 510 may be one processor, or may include a plurality of processors. The memory 520 may include a volatile memory (such as a RAM, or the memory may include a non-volatile memory such as a ROM, a flash memory, an HHD, or an SSD. Alternatively, the memory may include a combination of the foregoing types of memories. The memory 520 stores a computer-readable instruction, where the computer-readable instruction includes a plurality of software modules. For example, a BMP session module 522, a label receiving module 524, a route obtaining module 526, and a route sending module 528. After executing each software module, the processor 510 may perform a corresponding operation according to an indication of each software module. In this embodiment, an operation performed by a software module is actually an operation performed by the processor 510 according to an indication of the software module. The session module 522 is configured to establish a BMP session with a first routing device. The label receiving module 524 is configured to receive, from the first routing device, a BMP message that carries a VPN label. The route obtaining module 526 is configured to obtain routing information based on the VPN label. The routing information includes the VPN label, a destination address segment, a VPN instance identifier, and a next hop. The route sending module 528 is configured to send the routing information to a second routing device. In addition, after executing the computer-readable instruction in the memory 520, the processor 510 may perform, according to an indication of the computer-readable instruction, all operations that may be performed by the BMP server 150, for example, operations performed by the BMP server 150 in the embodiments corresponding to FIG. 1, FIG. 2, and FIG. 3.

The foregoing descriptions are merely examples of specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A method implemented by a first routing device, wherein the method comprises:
    establishing a Border Gateway Protocol (BGP) Monitoring Protocol (BMP) session with a BMP server;
    allocating a virtual private network (VPN) label associated with a VPN instance for communication between the first routing device and a second routing device, wherein the VPN label is configured to be carried-in data packets received by the first routing device from the second routing device; and
    sending, to the BMP server, a BMP message comprising the VPN label.

2. The method of claim 1, wherein the BMP message is an extended peer up notification message comprising a type-length-value (TLV), and wherein the TLV comprises the VPN label.

3. The method of claim 1, wherein the BMP message is a newly-defined BMP message comprising a protocol data unit (PDU), and wherein the PDU comprises the VPN label.

4. The method of claim 3, wherein the PDU comprises an identifier of the VPN instance and a corresponding relationship between the VPN label and an Internet Protocol (IP) address segment to which an IP address of a user equipment (UE) belongs.

5. The method of claim 1, wherein the VPN label is a multi-protocol label switching (MPLS) label or a Segment Routing over IPv6 (SRv6) segment identifier (SID).

6. The method of claim 1, further comprising:
    receiving, from the second routing device, a data packet whose destination is a user equipment (UE) and which comprises the VPN label;
    deleting the VPN label in the data packet to obtain a processed data packet; and
    sending the processed data packet to the UE based on the VPN label.

7. The method of claim 1, further comprising establishing a BGP session between the first routing device and the second routing device, wherein the VPN label is allocated in response to establishing the BGP session between the first routing device and the second routing device.

8. The method of claim 1, wherein the VPN label identifies the VPN instance.

9. A first routing device comprising:
    a memory configured to store instructions; and
    one or more processors coupled to the memory and configured to execute the instructions to:
        establish a Border Gateway Protocol (BGP) Monitoring Protocol (BMP) session with a BMP server;
        allocate a virtual private network (VPN) label associated with a VPN instance for communication between the first routing device and a second routing device, wherein the VPN label is configured to be carried in data packets received by the first routing device from the second routing device; and
        send, to the BMP server, a BMP message comprising the VPN label.

10. The first routing device of claim 9, wherein the BMP message is an extended peer up notification message comprising a type-length-value (TLV), and wherein the TLV comprises the VPN label.

11. The first routing device of claim 9, wherein the BMP message is a newly-defined BMP message comprising a protocol data unit (PDU), and wherein the PDU comprises the VPN label.

12. The first routing device of claim 11, wherein the PDU comprises an identifier of the VPN instance and a corresponding relationship between the VPN label and an Internet Protocol (IP) address segment to which an IP address of a user equipment (UE) belongs.

13. The first routing device of claim 9, wherein the VPN label is a multi-protocol label switching (MPLS) label or a Segment Routing over IPv6 (SRv6) segment identifier (SID).

14. The first routing device of claim 9, wherein the one or more processors are further configured to:
- receive, from the second routing device, a data packet whose destination is a user equipment (UE) and which comprises the VPN label;
- delete the VPN label in the data packet to obtain a processed data packet; and
- send the processed data packet to the UE based on the VPN label.

15. The first routing device of claim 9, wherein the one or more processors are further configured to establish a BGP session between the first routing device and the second routing device, and wherein the VPN label is allocated in response to establishing the BGP session between the first routing device and the second routing device.

16. The first routing device of claim 9, wherein the VPN label identifies the VPN instance.

17. A computer program product comprising instructions stored on a non-transitory computer-readable medium that, when executed by one or more processors, cause a first routing device to:
- establish a Border Gateway Protocol (BGP) Monitoring Protocol (BMP) session with a BMP server;
- allocate a virtual private network (VPN) label associated with a VPN instance for communication between the first routing device and a second routing device, wherein the VPN label is configured to be carried in data packets received by the first routing device from the second routing device; and
- send, to the BMP server, a BMP message comprising the VPN label.

18. The computer program product of claim 17, wherein the one or more processors are further configured to execute the instructions to cause the first forwarding device to:
- receive, from the second routing device, a data packet whose destination is a user equipment (UE) and which comprises the VPN label;
- delete the VPN label in the data packet to obtain a processed data packet; and
- send the processed data packet to the UE based on the VPN label.

19. The computer program product of claim 17, wherein the one or more processors are further configured to execute the instructions to cause the first forwarding device to establish a BGP session between the first routing device and the second routing device, and wherein the VPN label is allocated in response to establishing the BGP session between the first routing device and the second routing device.

20. The computer program product of claim 17, wherein the VPN label identifies the VPN instance.

\* \* \* \* \*